United States Patent [19]

McAlinn

[11] Patent Number: 4,480,044
[45] Date of Patent: Oct. 30, 1984

[54] HIGH EXPANSION GLASS-CERAMIC ARTICLES

[75] Inventor: Patrick McAlinn, Corning, N.Y.

[73] Assignee: Corning Glass Works, Corning, N.Y.

[21] Appl. No.: 575,902

[22] Filed: Feb. 1, 1984

[51] Int. Cl.$^3$ .............................................. C03C 3/22
[52] U.S. Cl. ........................................... 501/4; 501/5
[58] Field of Search ....................................... 501/4, 5

[56] References Cited

U.S. PATENT DOCUMENTS 2,971,853  2/1961  Stookey ................................. 501/4
4,328,305  5/1982  Rauscher ............................. 430/351

Primary Examiner—Mark Bell
Attorney, Agent, or Firm—C. S. Janes, Jr.

[57] ABSTRACT

The present invention relates to the production of photothermally crystallizable, chemically-machinable glass-ceramic articles exhibiting coefficients of thermal expansion over the temperature interval of 20°–400° C. between $120$–$160 \times 10^{-7}$/° C. Base glass articles having compositions consisting essentially, in weight percent, of 5.5–15% $Li_2O$, 2–25% $Al_2O_3$, the weight ratio $Al_2O_3$:$Li_2O$ being less than 1.7:1, 60–85% $SiO_2$, and at least one photosensitive metal in the indicated proportion selected from the group of 0.001–0.03% gold, computed as Au, 0.001–0.3% silver, computed as AgCl, and 0.001–1% copper, computed as $Cu_2O$, are first exposed to ultraviolet radiations to develop a latent image therein, then heated to a temperature between the annealing and softening points thereof to generate metallic nuclei therein and the growth of lithium metasilicate particles thereon, and, finally, heated to a temperature in excess of 700° C., but less than 800° C., to effect an essentially crystalline article, including the conversion of a portion of the lithium metasilicate crystals to lithium disilicate. Quartz and/or cristobalite will also be formed.

2 Claims, 6 Drawing Figures

HIGH EXPANSION GLASS-CERAMIC ARTICLES

BACKGROUND OF THE INVENTION

U.S. Pat. No. 2,971,853 discloses the production of glass-ceramic articles through the photothermal nucleation and crystallization of precursor glass articles having compositions within the $Li_2O$—$Al_2O_3$—$SiO_2$ system. The base glass compositions consist essentially, expressed in terms of weight percent on the oxide basis, of 5.5-15% $Li_2O$, 2-25% $Al_2O_3$, the weight ratio $Al_2O_3$:$Li_2O$ being less than 1.7:1, and 60-85% $SiO_2$, with a photosensitive metal in the indicated proportion selected from the group of 0.001-0.03% gold, computed as Au, 0.001-0.3% silver, computed as AgCl, and 0.001-1% copper, computed as $Cu_2O$, the above components constituting at least 90% by weight of the total compositions. The method for producing the articles comprises five general steps:

(1) a glass forming batch of a proper formulation is melted;

(2) the melt is cooled to a glass and essentially simultaneously an article of a desired configuration shaped therefrom;

(3) at least a portion of the glass article is exposed to short wave radiations, customarily ultraviolet radiation;

(4) at least the exposed portion of the article is heated to a temperature between the annealing and softening points of the glass to first initiate the formation of submicroscopic particles of metallic gold, silver, and/or copper to provide nuclei and thereafter to develop siliceous crystallites, including lithium metasilicate, on those nuclei; and then (5) at least that portion of the article is heated to above the softening point of the glass and to above 800° C., but not above 950° C., to effect an essentially crystalline article, including the conversion of lithium metasilicate crystals to lithium-containing crystals having a lower weight percentage of lithium, e.g., lithium disilicate.

The articles demonstrate the capability of being selectively etched or chemically sculptured. Thus, there is great solubility differential between the crystal phase and the precursor glass. Accordingly, patterns and designs can be cut into the parent glass article through selective exposure of a portion thereof to short wave radiations followed by the heat treatment to generate crystallization therein. Hence, the exposure to short wave radiation develops a latent image in the glass which is converted to a crystallized image via heat treatment. The crystallized areas are many times more soluble in dilute hydrofluoric acid than is the glass. Accordingly, intricate designs can be accurately carved in the article through removal of the crystalline regions.

The patent notes the occurrence of a number of possible crystal phases in the products including lithium disilicate, lithium metasilicate, quartz, β-quartz, and β-spodumene; and the product of one of the working examples provided in the specification, containing lithium disilicate as the major crystal phase with a minor proportion of quartz, exhibited a coefficient of thermal expansion of about $100 \times 10^{-7}/°C$. Also, Corning Glass Works, Corning, N.Y., markets a product prepared in accordance with the method and composition of that patent under the trademark FOTOCERAM®. That product, designated as Code 8603, has a microstructure consisting essentially of lithium disilicate, exhibits a coefficient of thermal expansion of about $105 \times 10^{-7}/°C$. over the range of temperatures 20°-400° C., and has the following approximate composition, in weight percent:

| $SiO_2$ | 79.8 | ZnO | 1.0 |
|---|---|---|---|
| $Li_2O$ | 9.4 | $Sb_2O_3$ | 0.4 |
| $K_2O$ | 4.0 | $CeO_2$ | 0.012 |
| $Al_2O_3$ | 3.9 | Ag | 0.12 |
| $Na_2O$ | 1.5 | Au | 0.0013 |

U.S. Pat. No. 4,328,305 discloses several commercial applications utilizing the capability of Code 8603 articles to be chemically machined; one particular application being head pads for use in the information storage field. Thus, head pads or sliders which support the ferrite element that senses the data magnetically stored on information discs have been fashioned from Code 8603 material. In practice, the glass-ceramic head pad, which contacts the storage disc, is sealed to the ferrite element, customarily through the agency of a commercial sealing frit. Because the ferrite material demonstrates a coefficient of thermal expansion (20°-400° C.) of about $120 \times 10^{-7}/°C$., frequent cracking and breakage have been experienced because of the substantial difference in thermal expansion existing between Code 8603 and the ferrite element. And recently, very high performance manganese-zinc ferrite materials have been developed for the element which exhibit coefficients of thermal expansion up to about $150 \times 10^{-7}/°C$. Accordingly, chemically machinable glass-ceramics manifesting coefficients of thermal expansion substantially higher than Code 8603 were sought, such that seals of low stress could be developed with those ferrites. The production of such glass-ceramic comprises the primary objective of this invention.

SUMMARY OF THE INVENTION

That objective can be accomplished through the careful observation of critical process parameters applied to the precursor glass compositions disclosed in U.S. Pat. No. 2,971,853. That is, by careful control of the flux (intensity × time) of the exposure and the character of the subsequent heat treatments (temperature and time), it is possible to produce glass-ceramic articles having coefficients of thermal expansion (20°-400° C.) between about $120-160 \times 10^{-7}/°C$.

I have found that the desired coefficient of thermal expansion can be obtained by generating the proper crystalline microstructure in the body. Thus, the flux of the exposure to shortwave (ultraviolet) radiations determines the number of photosensitive metal nuclei developed within the precursor glass. The initial, relatively low temperature heat treatment, i.e., between the annealing and softening points of the glass, causes each of those nuclei (~80 Å or somewhat larger in size) to nucleate and grow a lithium metasilicate crystal. It is apparent, therefore, that the greater the number of nuclei developed, the greater the number and the more uniformly-sized will be the lithium metasilicate crystals. The second and higher temperature heat treatment acts to convert a portion of the lithium metasilicate crystals to lithium disilicate crystals. It will be appreciated that the generation of lithium metasilicate and lithium disilicate may not be totally complete, i.e., there may be solid solutions of each present. Consequently, the use of the terms lithium metasilicate and lithium disilicate must be understood to comprehend solid solutions thereof.

Also, furthermore, the higher temperature causes a phase transformation to take place in the residual glassy matrix of the glass-ceramic, viz., the conversion of silica to quartz and/or cristobalite. It is readily understood that the quantity of residual glassy phase is dependent upon the extent of crystallization in the body. And, as has been disclosed above, the crystal content of the body is a function of both exposure flux and character of heat treatment.

It will be appreciated that each of those crystal phases demonstrates a different coefficient of thermal expansion. Consequently, the overall coefficient of thermal expansion exhibited by the final article comprises a composite of the phases, and will reflect the amount or ratio of each crystal present in the product. The coefficients of thermal expansion (20°–400° C.) of the four crystals are recorded below:

| | |
|---|---|
| α-cristobalite | $580 \times 10^{-7}/°C.$ |
| α-quartz | $674 \times 10^{-7}/°C.$ |
| Lithium Metasilicate | $130 \times 10^{-7}/°C.$ |
| Lithium Disilicate | $114 \times 10^{-7}/°C.$ |

Contrary to the disclosure in U.S. Pat. No. 2,971,853, I have found that glass-ceramic articles capable of being chemically sculptured and having coefficients of thermal expansion between about $120-160 \times 10^{-7}/°C.$ (20°–200° C.) can be prepared from precursor glasses having compositions within the ambit of that patent, but wherein the temperature of the final heat treatment is in excess of the softening point of the glass, but less than 800° C. and, preferably, no higher than about 780° C. It is believed that two mechanisms are working to effect the observed higher expansion.

First, because the development of lithium disilicate crystals takes place slowly at the low temperatures, the ratio of lithium metasilicate crystals to lithium disilicate crystals is greater with the lower temperature heat treatment; and, as a consequence, Second, the level of silica available to form cristobalite and/or quartz crystals is higher.

The required exposure flux is a function of glass composition and the subsequent low temperature treatment for the formation of lithium metasilicate crystals. In general, the exposure flux is determined empirically based upon the rate at which the body can be etched in dilute HF acid. Hence, as noted above, the exposure flux controls the number of photosensitive metal nuclei developed within the parent glass; and the greater the number of nuclei formed, the greater the number of lithium metasilicate crystals formed during the subsequent low temperature heat treatment. As can be appreciated, the rate at which lithium metasilicate crystals are grown on the nuclei is a function of the temperature employed in the heat treatment. Accordingly, the exposure and heat treating parameters will be explored to devise the optimum combination thereof.

In the research undergirding the present inventive process, collimated light from a 1000 watt mercury-xenon vapor lamp having substantial intensity at about 315 nm provided the source of ultraviolet radiation. With that equipment an exposure of about 15 seconds has been found to be a practical minimum exposure to secure satisfactory development of nuclei. Shorter and-/or less intense exposures commonly do not generate sufficient nuclei to provide the necessary subsequent crystallization of relatively uniformly-sized lithium metasilicate. Of course, more intense sources of ultraviolet radiation will be operable at shorter exposure times.

In summary, the process parameters vital to obtaining the desired glass-ceramic articles include:

(1) an exposure flux at least equivalent to an exposure of about 15 seconds to collimated radiation from a 1000 watt mercury-xenon vapor lamp having substantial intensity at about 315 nm;

(2) a low temperature heat treatment conducted at temperatures between the annealing and softening points of the glass, normally no higher than about 600° C. and, conveniently at about 550°–600° C. The length of exposure to produce a lithium metasilicate body of high crystallinity is a function of the temperature utilized; the higher the temperature, the shorter the time required. However, to insure more uniformly-sized crystallization, a longer period at a lower temperature may be employed. In general, times ranging between about 0.5–6 hours within that temperature interval will be employed.

(3) A high temperature heat treatment conducted at temperatures in excess of about 700° C., but less than 800° C. The conversion of lithium metasilicate to lithium disilicate occurs more rapidly at higher temperatures with the consequent reduction in silica content available for conversion to quartz. Accordingly, temperature control is critical. In general, times ranging between about 0.5–20 hours within that temperature interval will be employed. The preferred practice contemplates temperatures between about 750°–780° C. for about 0.5–8 hours.

BRIEF DESCRIPTION OF THE DRAWINGS

FIG. 1 also indicates the relationship present between exposure flux and the level of cristobalite in the final product.

DESCRIPTION OF PREFERRED EMBODIMENTS

Square-faced bars of about 2" in length and 0.25" cross section were cut from an article of glass having the composition above designated as Code 8603 and were subjected to the ultraviolet exposures and heat treatments reported below. The source of the ultraviolet radiation was the above-described 1000 watt mercury-xenon vapor lamp.

Figure 1:
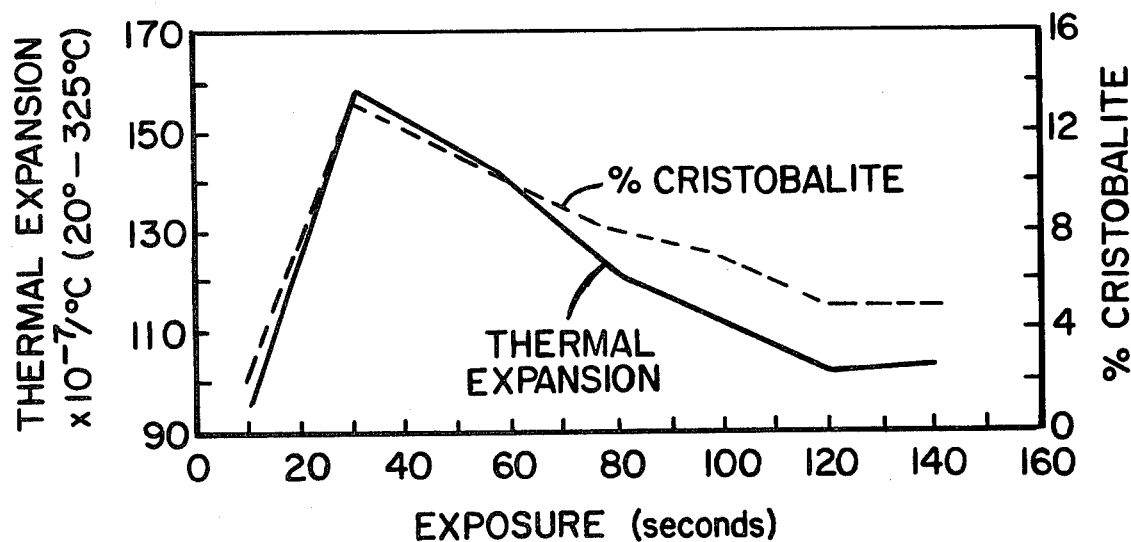
FIG. 1 is a graphic representation of the relationship which exists between the period of exposure to ultraviolet radiation and the thermal expansion of the final product.

FIG. 1 graphically depicts the effect upon thermal expansion which occurs as the exposure to ultraviolet is varied in 10 second intervals, but the heat treatment is held constant. The low temperature heat treatment involved a temperature of 580° C. for 96 minutes and the high temperature segment utilized 775° C. for 55 minutes. As can be observed, with that cycle of low and high temperature treatments a maximum coefficient of thermal expansion can be achieved at about 30 seconds. Although coefficients between $120-160 \times 10^{-7}/°C$. can be obtained by means of short exposures, viz., about 15-30 seconds, control of the desired expansion is more easily accomplished with longer exposures, because the effect upon expansion is much less pronounced with changes in exposure time. Furthermore, longer exposures yield a harder and more durable crystal structure due to an increasing amount of lithium disilicate being produced. The general configuration of this curve holds true for each subsesquently-applied heat treatment time-temperature combination of the thermal cycle.

As can be seen from FIG. 1, exposures in excess of about 90 seconds yield bodies exhibiting coefficients of thermal expansion of less than about 120. However, as has been explained previously, the operable exposure flux is a function of glass composition and the subsequent low temperature heat treatment. FIG. 1 also indicates the relationship existing between exposure flux and the level of cristobalite present in the composite crystal structure, as determined by means of X-ray diffraction techniques. The two curves are believed to support the conclusion that there is a strong correlation between thermal expansion and the amount of cristobalite in the body. That conclusion is reinforced in the thermal expansion curves set out in FIGS. 4 and 5 below.

Figure 2:
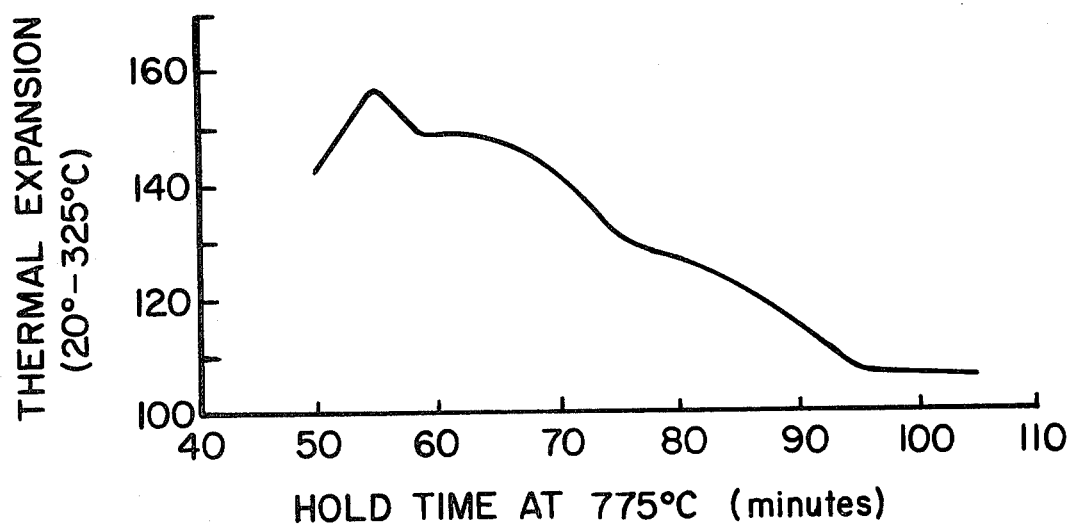
FIG. 2 graphically depicts the relationship existing between the period of high temperature heat treatment and the thermal expansion of the final product.

FIG. 2 illustrates the effects on coefficient of expansion which take place with varying times of high temperature heat treatment, but where the ultraviolet exposure is held constant at 80 seconds, the low temperature heat treatment comprises 96 minutes at 580° C., and the high temperature heat treatment is conducted at 775° C. Again, whereas coefficients between $120-160 \times 10^{-7}/°C$. are possible with dwell times as brief as about 40 minutes, better control can be achieved with more extended periods, and the crystal structures are harder and more durable because of the greater proportions of lithium disilicate being generated. And again, the general outline of this curve will hold for each high temperature level of heat treatment employed where the exposures and low temperature heat treatments are maintained constant.

Figure 3:
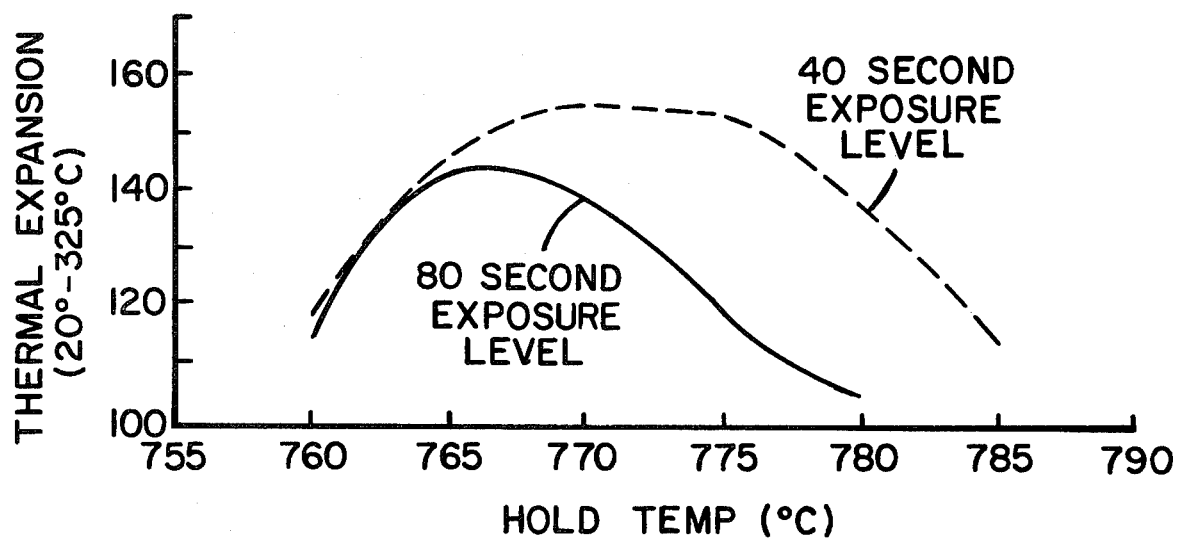
FIG. 3 graphically records the temperature sensitivity of the high temperature heat treatment with regard to thermal expansion of the final product for two different periods of ultraviolet exposure.

FIG. 3 depicts the temperature sensitivity of the high temperature heat treatment with respect to expansion coefficient for two different levels of ultraviolet exposure, viz., 40 seconds and 80 seconds, where the time of the high temperature heat treatment is maintained constant. The low temperature heat treatment utilized a temperature of 580° C. for 96 minutes and each high temperature value was held for 50 minutes. Yet again, because of better control, a longer treatment at a lower temperature is deemed preferable to a shorter term, higher temperature sequence.

Figure 4:
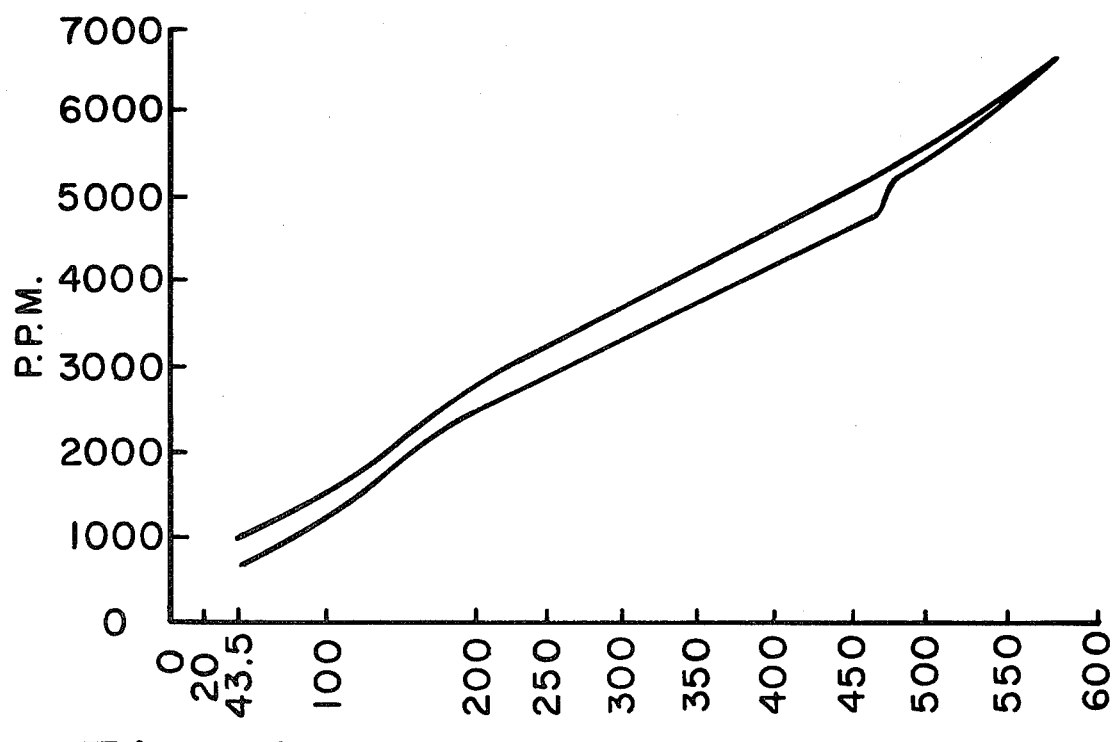
FIG. 4 reports the thermal expansion curve of a commercially-marketed product prepared in accordance with U.S. Pat. No. 2,971,853.
Figure 5:
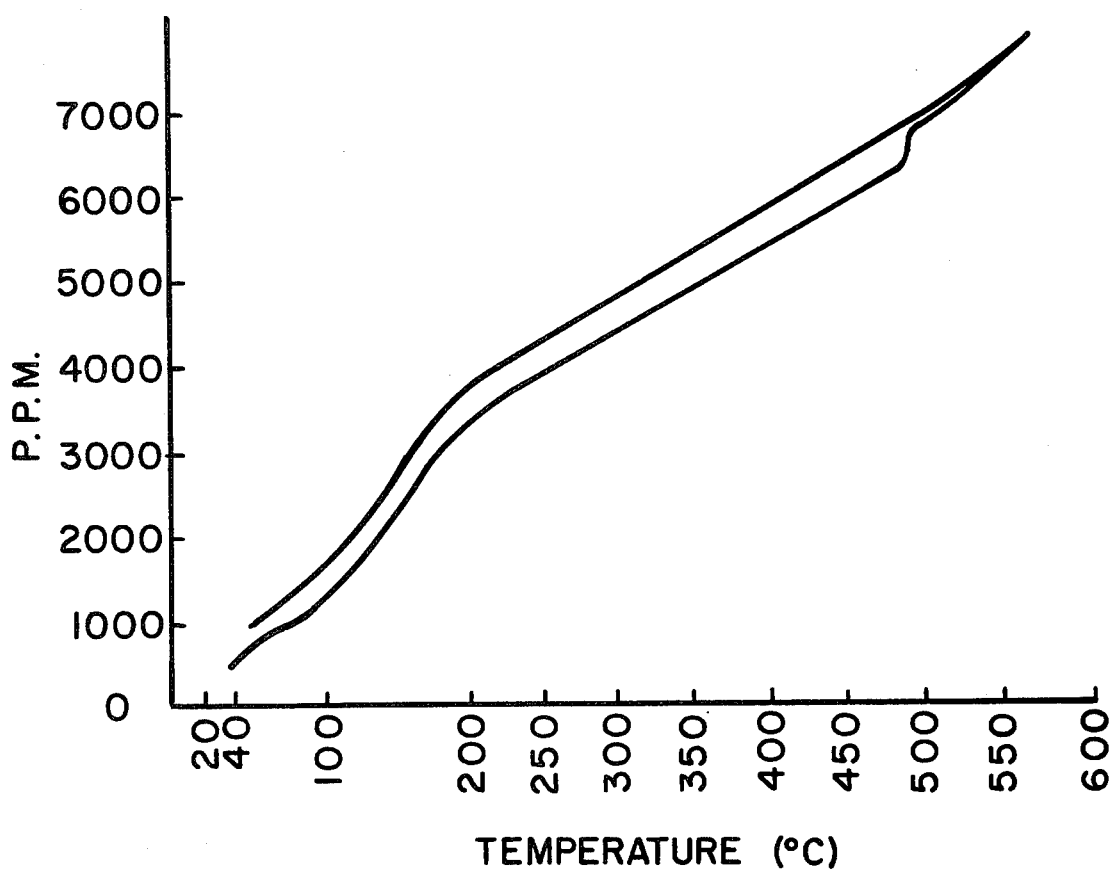
FIG. 5 traces the thermal expansion curve of a product made in accordance with the present invention.

FIG. 4 sets forth the thermal expansion curve for commercially-marketed Code 8603 glass-ceramic and FIG. 5 traces the thermal expansion curve exhibited by Code 8603 which is treated in accordance with the process parameters of the present invention; viz., an exposure of 20 seconds to collimated radiation from a 1000 watt mercury-xenon vapor lamp having substantial intensity at about 315 nm; a heat treatment at 580° C. for 96 minutes; and a heat treatment at 775° C. for 55 minutes. Those curves indicate that the occurrence of an increased amount of cristobalite constitutes a large factor in raising the thermal expansion. The relative amount of cristobalite in the composite structure can be determined by the degree of volume or density change that occurs at ~225° C. This change in density is the result of a phase transformation from $\alpha$-cristobalite to $\beta$-cristobalite. Also, whereas not shown in FIG. 5, a phase transformation from $\alpha$-quartz to $\beta$-quartz takes place at ~575° C.

Figure 6:
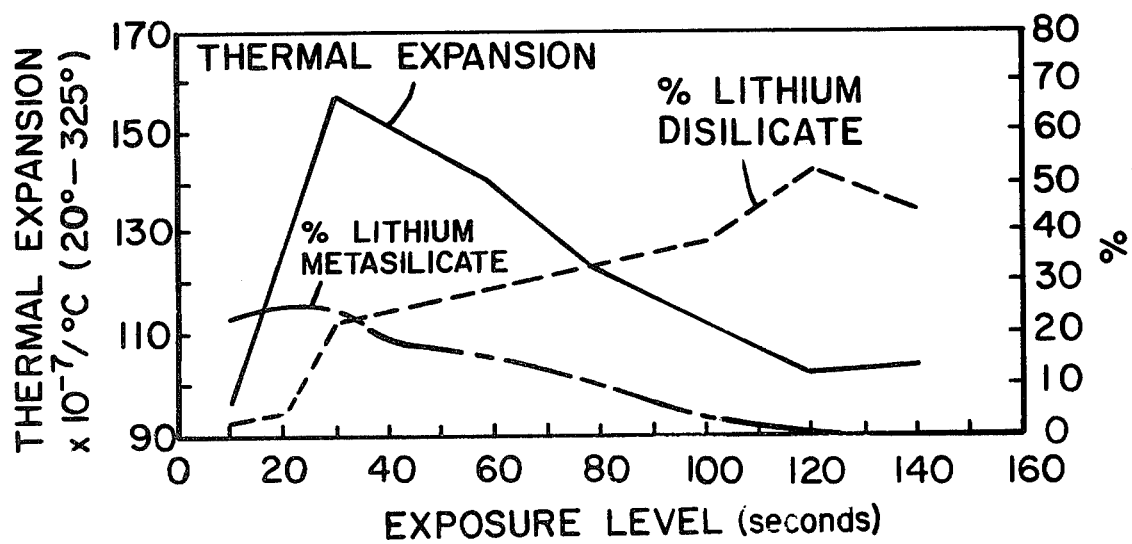
FIG. 6 graphically illustrates the correlation present between the period of exposure to ultraviolet radiation and thermal expansion, and between the period of exposure to ultraviolet radiation and the quantities of lithium metasilicate and lithium disilicate in the final product.

FIG. 6 graphically portrays the relationship appertaining between exposure flux and thermal expansion and between exposure flux and the levels of lithium metasilicate and lithium disilicate present. The subsequent heat treatment held constant comprised 580° C. for 96 minutes followed by 775° C. for 55 minutes. It is evident that, as the exposure flux increases, the amount of lithium metasilicate decreases, and the quantity of lithium disilicate increases.

I claim:

1. A chemically-machinable glass-ceramic exhibiting a coefficient of thermal expansion over the interval of 20°-400° C. of about $120-160 \times 10^{-7}/°C$. consisting predominantly of lithium metasilicate, lithium disilicate, and quartz and/or cristobalite crystals dispersed in a residual glassy matrix, said glass-ceramic having a composition consisting essentially, expressed in terms of weight percent on the oxide basis, of 5.5-15% $Li_2O$, 2-25% $Al_2O_3$, the weight ratio $Al_2O_3:Li_2O$ being less than 1.7:1, 60-85% $SiO_2$, and at least one photosensitive metal in the indicated proportion selected from the group of 0.001-0.03% gold, computed as Au, 0.001-0.3% silver, computed as AgCl, and 0.001-1% copper, computed as $Cu_2O$, the sum of those components constituting at least 90% by weight of the total composition.

2. A chemically-machinable glass-ceramic according to claim 1 wherein said glass-ceramic has the following approximate composition:

| $SiO_2$ | 79.8 | ZnO | 1.0 |
|---|---|---|---|
| $Li_2O$ | 9.4 | $Sb_2O_3$ | 0.4 |
| $K_2O$ | 4.0 | $CeO_2$ | 0.012 |
| $Al_2O_3$ | 3.9 | Ag | 0.12 |
| $Na_2O$ | 1.5 | Au | 0.0013 |

* * * * *